United States Patent [19]

Medlin

[11] 3,958,699
[45] May 25, 1976

[54] CHARGING MACHINE
[75] Inventor: John B. Medlin, Newark, Del.
[73] Assignee: The United States of America as represented by the United States Energy Research and Development Administration, Washington, D.C.
[22] Filed: July 13, 1954
[21] Appl. No.: 443,187

[52] U.S. Cl. .................................. 214/23; 176/32; 214/18 N
[51] Int. Cl.² .................... G21C 19/20; F23K 3/00
[58] Field of Search .................. 214/18, 23; 176/30, 176/31, 32, 61, 50

[56] References Cited
UNITED STATES PATENTS

| | | | |
|---|---|---|---|
| 1,712,831 | 5/1929 | Laurence | 214/18 |
| 1,755,072 | 4/1930 | Otis | 214/18 |
| 1,756,584 | 4/1930 | Cope | 214/18 |
| 2,307,413 | 1/1943 | Loux | 214/18 |

Primary Examiner—Verlin R. Pendegrass
Assistant Examiner—S. A. Cangialosi
Attorney, Agent, or Firm—Dean E. Carlson; Arthur A. Churm; Edgar J. Werlich

ABSTRACT

A charging machine for loading fuel slugs into the process tubes of a nuclear reactor includes a tubular housing connected to the process tube, a charging trough connected to the other end of the tubular housing, a device for loading the charging trough with a group of fuel slugs, means for equalizing the coolant pressure in the charging trough with the pressure in the process tubes, means for pushing the group of fuel slugs into the process tube and a latch and a seal engaging the last object in the group of fuel slugs to prevent the fuel slugs from being ejected from the process tube when the pusher is removed and to prevent pressure liquid from entering the charging machine.

3 Claims, 11 Drawing Figures

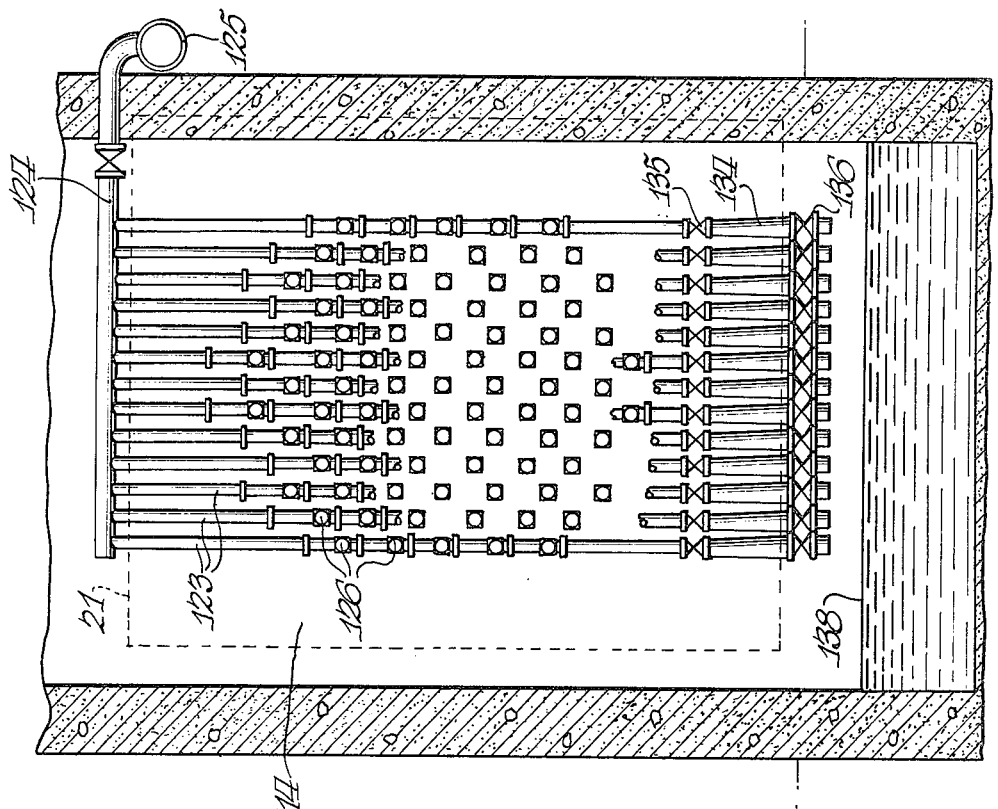
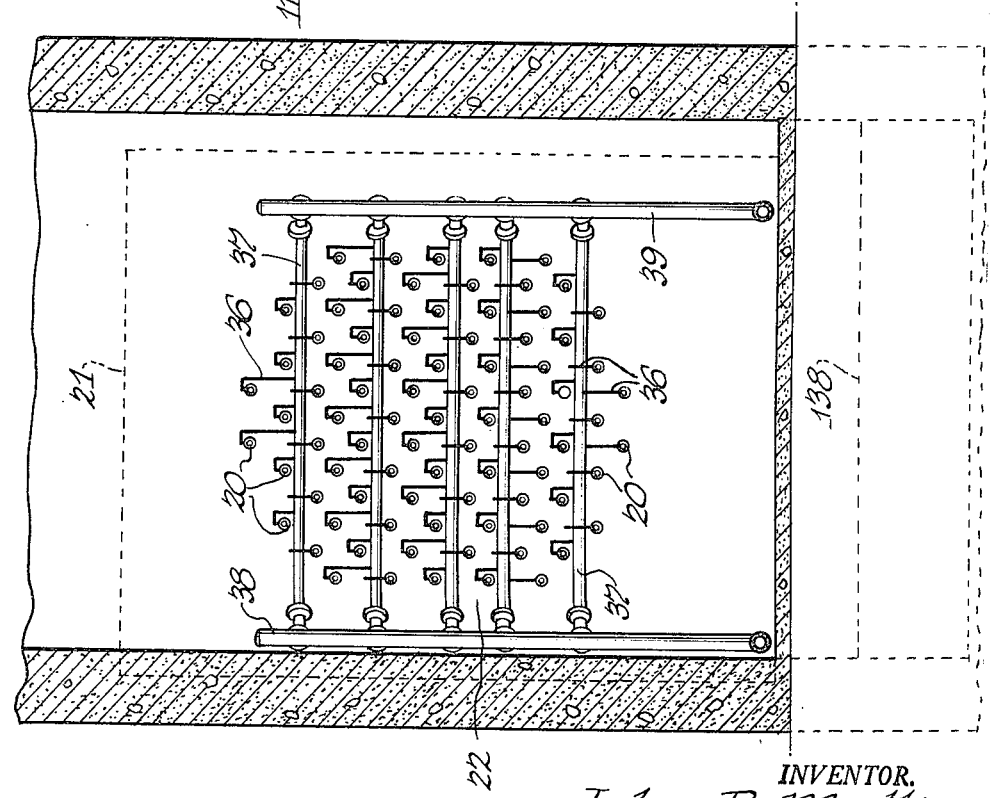

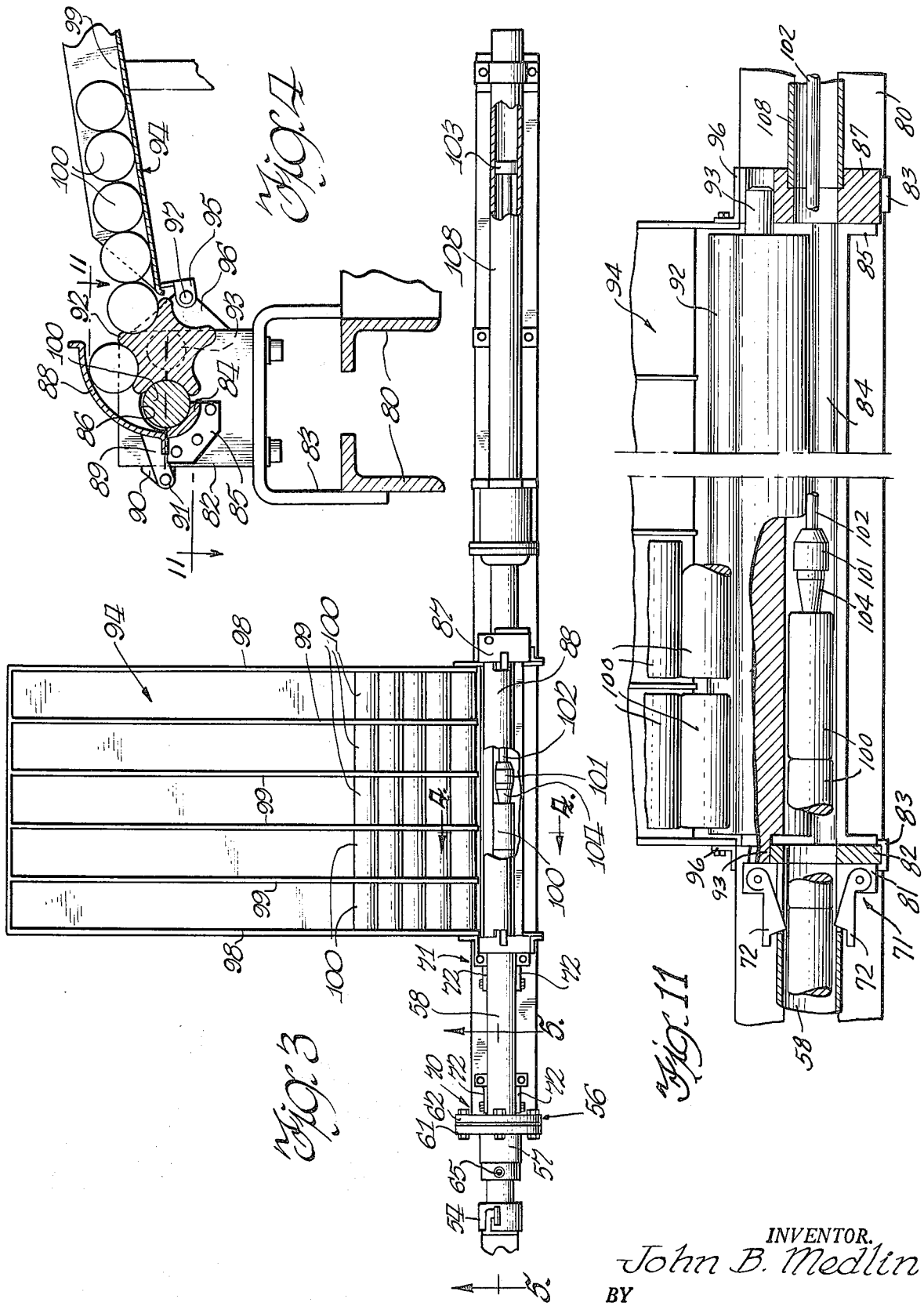

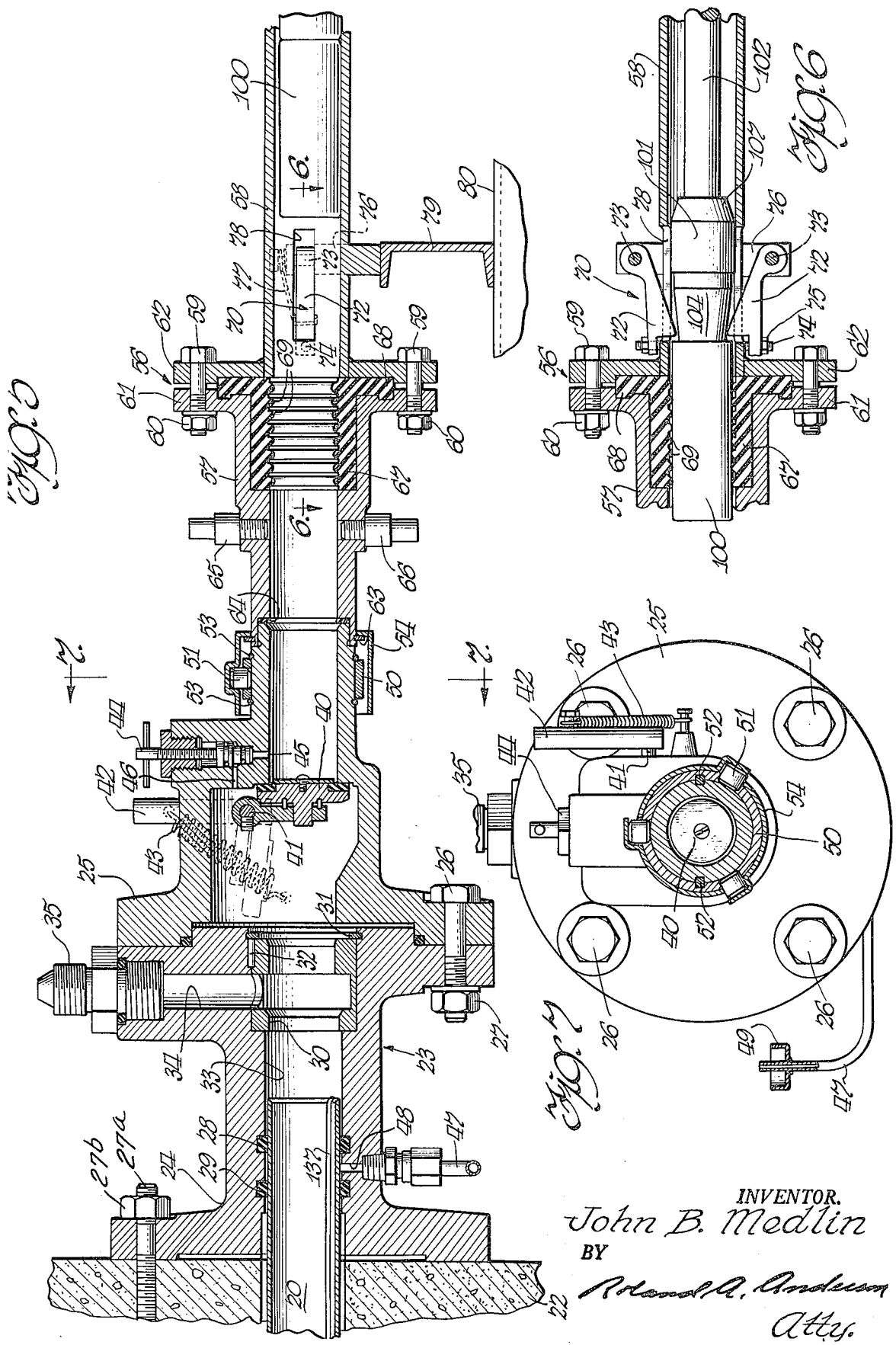

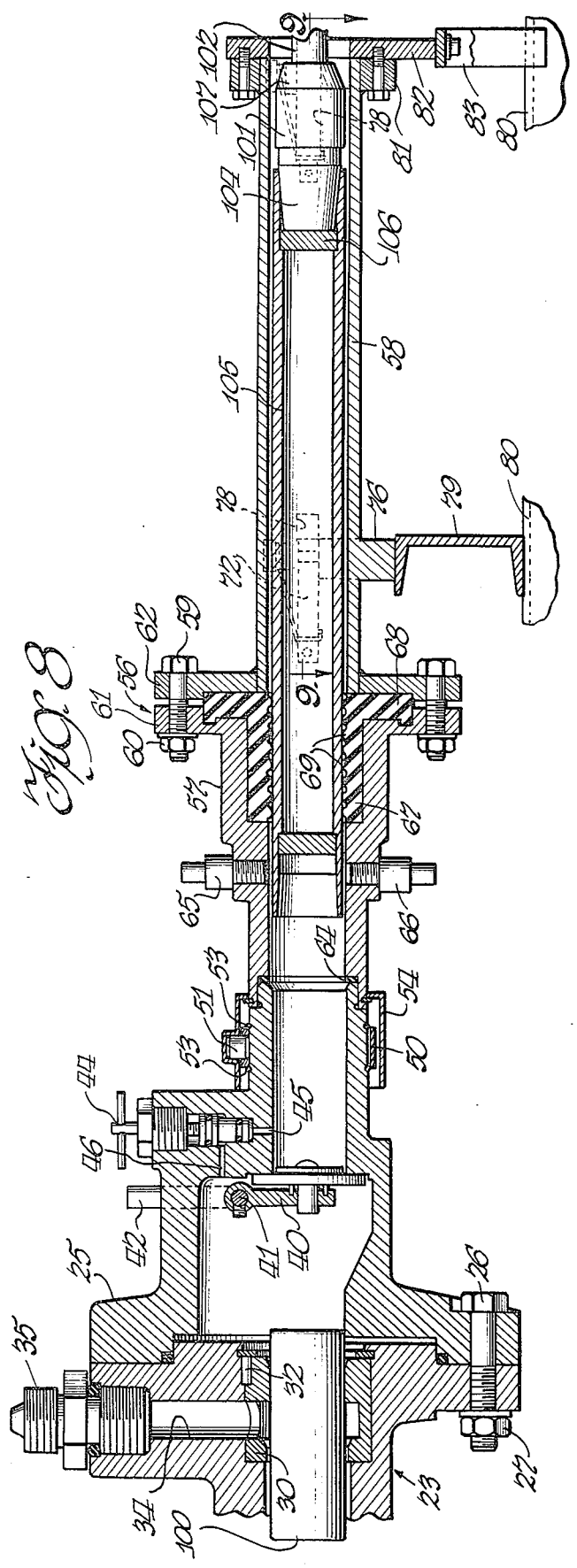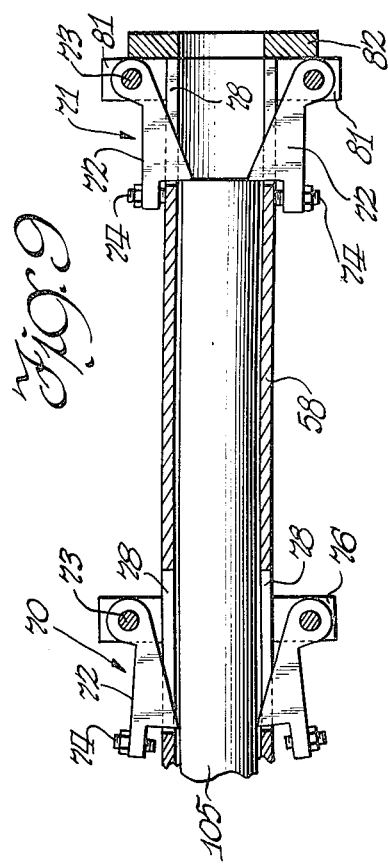

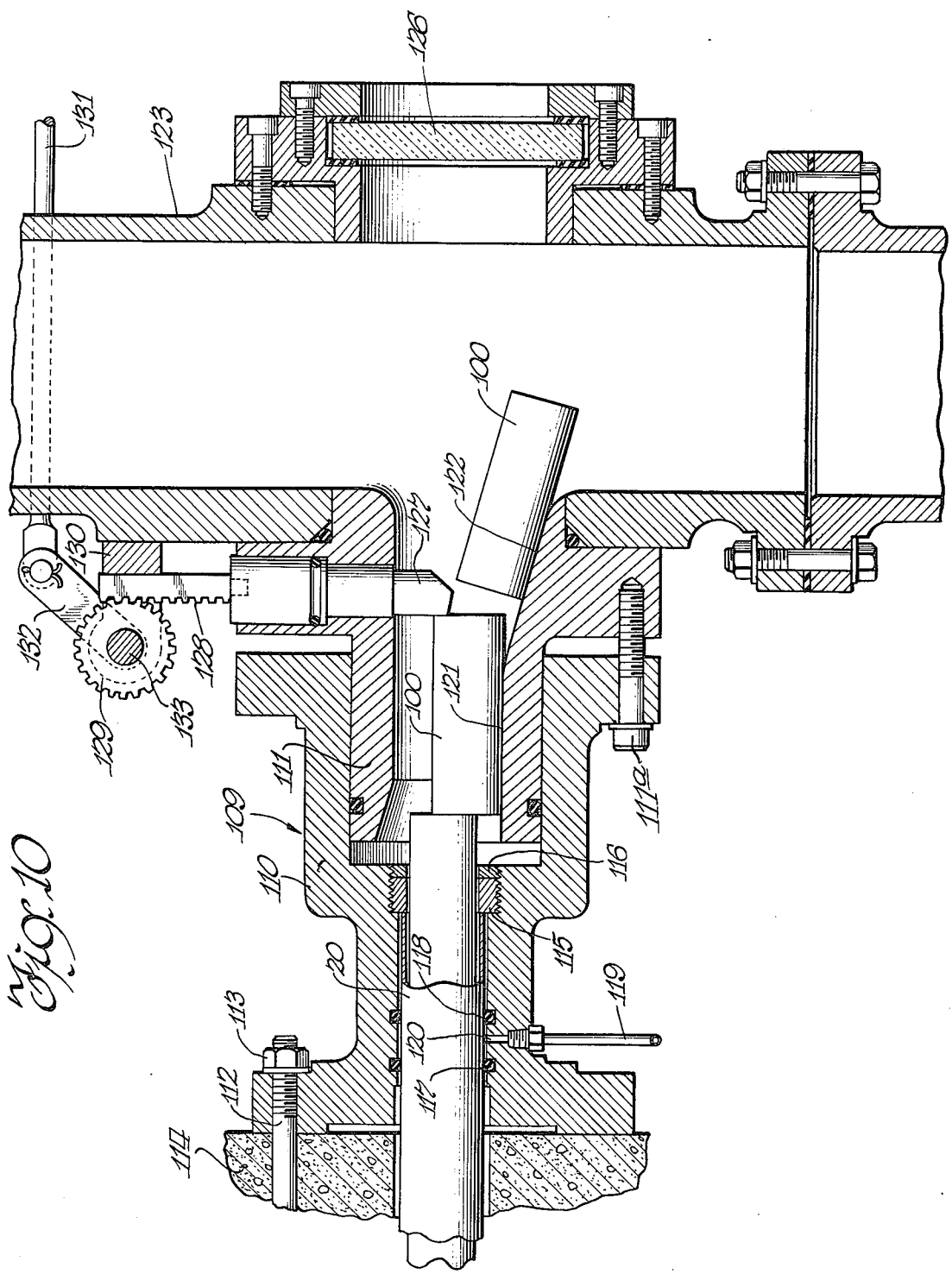

CHARGING MACHINE

This invention relates to a machine for charging a tube with objects and for discharging the objects from the tube. More specifically, it relates to a machine for loading slugs of fissionable material in the process tube of a neutronic reactor while a cooling liquid under pressure is continuously flowing through the tube.

It is known to construct a neutronic reactor having groups of aligned bodies or slugs of natural uranium spaced from one another in a moderator of graphite. The slugs have protective coverings of a metal such as aluminum and are positioned in process tubes that may be formed of aluminum and through which a cooling liquid such as water is caused to flow, since the process of fission generates considerable heat which must be conducted away. Certain of the slugs of natural uranium may be replaced by slugs of other materials to be irradiated. Reference is made to Fermi et al, U.S. Pat. No. 2,708,656, dated May 17, 1955, for a more complete disclosure of neutronic reactors of this type.

It may be desirable to continue the supplying of cooling liquid to the process tubes while slugs are being loaded and unloaded from the process tubes, in order that the reactor may continue operating during loading and unloading.

The present invention has for its principal object the provision of a machine for loading a tube with objects while a liquid is flowing through the tube.

Other objects will become apparent from the disclosure that follows. In the drawings:

FIG. 1 is an elevation, partly in section, of the charging side of a neutronic reactor to which the charging machine of the present invention is applied;

FIG. 2 is an elevation, partly in section, of the discharging side of the neutronic reactor;

FIG. 3 is a plan view, with parts broken away, of the charging machine of the present invention;

FIG. 4 is a vertical sectional view taken on the line 4—4 of FIG. 3 and showing an indexing means for transferring slugs from a loading tray to a charging trough;

FIG. 5 is a vertical sectional view taken on the line 5—5 of FIg. 3 and showing certain details of the charging machine and the manner of attachment of the charging machine to the neutronic reactor;

FIG. 6 is a horizontal sectional view taken on the line 6—6 of FIG. 5 and showing a pusher, a seal, and a latch for holding a slug in the seal, all forming part of the charging machine;

FIG. 7 is a vertical sectional view taken on the line 7—7 of FIg. 5 and illustrating the coupling of the charging machine to the reactor and a leak indicator on the reactor;

FIG. 8 is a sectional view similar to FIG. 5 but showing the use of an extension on the pusher of the charging machine;

FIG. 9 is a horizontal sectional view taken on the line 9—9 of FIG. 8 and showing two sets of latches in the charging machine and the pusher extension retained by one of them;

FIG. 10 is a vertical sectional view showing the discharging side of the reactor; and FIG. 11 is a horizontal sectional view taken on the line 11—11 of FIG. 4.

As previously stated, the charging machine of the present invention is intended for use with a neutronic reactor of the type disclosed in the aforementioned Fermi et al. patent. As shown in FIG. 1, this reactor includes a plurality of aluminum process or coolant tubes 20 appropriately spaced from one another in a graphite moderator 21, which is indicated in outline in FIGs. 1 and 2.

The charging end of one of these aluminum tubes 20 is shown in FIG. 5 to project through a concrete shield 22 and into an inlet fitting 23. This fitting comprises a body 24 and a nozzle member 25 secured to it by bolts 26 and nuts 27. The body 24 is secured to the concrete shield 22 by bolts 27a and nuts 27b, one bolt and one nut being shown in FIG. 5. The end of the process tube 20 rests in ring seals 28 and 29 spaced from one another and positioned in grooves formed in the body 24. An annulus 30 is mounted and held in the body 24 by means of a snap ring 31 and a key 32 at the intersection of a main passage 33, in which the end of the process tube 20 is positioned, and a cross passage 34. An adaptor 35 is attached to the body 24 at the cross passage 34 and serves to connect a line 36 (FIG. 1) to the body 24. The line 36 is connected to a horizontal cross pipe 37, which has its ends connected to two vertical side pipes 38 and 39. As shown in FIG. 1 there is a plurality of horizontal cross pipes 37 connected to the vertical pipes 38 and 39, and there is a plurality of lines 36 connected to each cross pipe 37.

As shown in FIG. 5, the nozzle member 25 of the fitting 23 is closed by a flap valve 40, which is pivotally mounted in the nozzle member 25 on a shaft 41. A handle 42 secured to the shaft 41 on the outside of the nozzle member 25 pivots the flap valve 40 between the closed full-line position of FIG. 5 and the open broken-line position of FIG. 5. An over-center spring 43 connected between the handle and the nozzle member 25, holds the flap valve in either position. a bleed valve 44 adjustably mounted in the nozzle member regulates a by-pass around the flap valve 40 made up of passages 45 and 46 formed in the nozzle member. A leak indicator in the form of a U-shaped tube 47 has one end connected to a passage 48 in the fitting body 24 located between the seals 28 and 29 around the end of the process tube 20, and the other end open and provided with a cup 49 to catch any fluid that may come out of the open end, because of any imperfection in the seals 28 and 29.

The end of the nozzle member 25 beyond the flap valve 40 is provided with a ring 50 and a plurality of lugs 51 set in the ring in generally equally spaced relation to one another. The ring 50 is held against angular movement with respect to the nozzle member 25 by means of opposed keys 52 and against axial movement with respect to the nozzle member 25 by means of snap rings 53. The ring 50 and lugs 51 constitute a connecting means which cooperates with a connector 54 of the charging machine to attach the charging machine to the inlet fitting 23.

The charging machine includes a tubular assembly 56 comprising a forward tubular member 57 and a rearward tubular member 58 joined to one another by bolts 59 and nuts 60, which are applied to flanges 61 and 62 formed respectively on the forward member 57 and rearward member 58. The connector 54 is mounted on the forward tubular member 57 and is limited in its movement in one direction therealong by a snap ring 63. The connector 54 has bayonet slots that receive the lugs 51 on the nozzle member 25, and thereby the forward tubular member is held against the nozzle member with a ring seal 64 positioned therebetween. A relief vale 65 and a drain valve 66 are mounted in the forward tubular member 57, respectively, in the top and bottom thereof. A tubular seal 67 is mounted in the forward tubular member 57 and has an outwardly extending flange 68 which is clamped between the flanges 61 and 62 of the tubular members 57 and 58. The seal 67 has annular ribs 69 on its interior which are of smaller diameter than the interiors of the tubular members 57 and 58.

As shown in FIG. 9 the rearward tubular mmeber 58 is provided with a forward latch assembly 70 and a rearward latch assembly 71, each comprising a pair of opposed latch elements 72 pivotally mounted on pins 73 and provided with screw 74 threaded through the ends of the latching elements, and lock nuts 75 threaded on the screws 74. In the case of the forward latch assembly 70, the pins 73, which mount the latch elements 72, are affixed to a block 76 which as shown in FIGS. 8 and 9 is formed integral with the forward end of the rearward tube member 58 and extends around the lower half thereof. As shown in FIG. 5 for one pin spring 77 coiled about each pin 73a acts against the associated latch element 72 to urge it into the rearward tubular member 58 through a slot 78 formed in the side thereof. The associated screw 74 which engages the exterior of the rearward tube member 58 is adjusted to regulate the amount that the latching element 72 projects into the rearward tubular member 58. The block 76 rests upon and is secured to a channel 79 which in turn is secured to a support 80 which runs along and beneath the charging machine. As shown in FIG. 9, the pins 73 of the rearward latch assembly 71 are attachehd to a flange 81 which as shown in FIG. 8 is attached to and surrounds the rearward end of the rearward tubular member 58. As shown in FIGS. 4 and 8, the flange 81 is secured to a block 82 which rests upon and is attached to an inverted U-shaped member 83 secured to the support 80.

As shown in FIGS. 4 and 11, a trough 84 has end flanges 85 by one of which it is secured to the block 82, and extends therefrom in alignment with the tubular members 57 and 58. The block 82 has an opening 86 which provides connection between the trough 84 and the rearward tubular member 58. The block 82 through its connection with one end flange 85 on the trough 84 supports one end of the trough, and the other end thereof is supported through a similar connection at the other end flange 85 with a block 87. A cover 88 is provided over the trough 84 and is pivotally mounted on the blocks 82 and 87 by means illustrated in FIG. 4 as applied to the block 82, namely, an arm 89 secured to one end of the cover, a bracket 90 formed on the block 82 and a hinge pin 91 connecting the arm and the bracket. Positioned opposite the trough 84 is an indexing roller 92 which has end portions 93 journaled in the blocks 82 and 87. A loading tray 94 extends laterally and slightly upwardly from the indexing roller 92 and has one end supported on the blocks 82 and 87 through brackets 95 and 96, attached, respectively, to the tray and the blocks and pins 97 connecting the blocks. The tray 94 has side flanges 98 and four partitions 99 which provide spaces along which five groups of jacketed slugs or bodies 100 move simultaneously toward the indexing roller 92.

The charging machine is provided with a pusher for the slugs 100 moved from the tray 94 by the indexing roller 92 into the trough 84. As shown in FIGS. 3 and 11, this pusher comprises a plunger 101, a rod 102 having one end secured to the plunger 101, and a piston 103 secured to the other end of the rod 102. The plunger 101 has a tapered portion 104 which, as shown in FIG. 8 fits in one end of a hollow extension 105 for the pusher and abuts a disc 106 that is secured within the extension 105. The plunger also has a rear portion 107 which is tapered so that the plunger will pass the latch assemblies 70 and 71 when moving to the right as viewed in FIGS. 5, 6, 7, 8, and 9. As shown in FIGS. 3, the piston 103 is slidably mounted in a cylinder 108 to the opposite ends of which fluid under pressure may be supplied to move the piston in one direction or the other, the piston moving the plunger in one direction or the other. The cylinder 108 is carried by the support 80.

The discharge side of the neutronic reactor is illustrated in FIGS. 2 and 10, wherein it will be seen that each process or coolant tube 20 extends into and terminates in a discharge fitting 109, which is formed in two parts 110 and 111, the part 111 entering the part 110 and being secured thereto by screws 111a, one of which is shown in FIG. 10. The part 110 is secured by bolts 112 and nuts 113 to a concrete shield 114 located just beyond the graphite moderator 21. A stop nut 115 threaded into the part 110 abuts the end of the coolant tube 20 to hold it in position in the reactor. A lock nut 116 is threaded into the part 110 against the stop nut 115 to keep it in position. Seal rings 117 and 118, positioned in grooves in the part 110 seal the process tube 20 and the part 110 so that coolant flowing through the process tube is prevented from entering the neutronic reactor around the process tube. A tube 119 is connected to a passage 120 in the fitting part 110 between the seals 117 and 118 and is similar in construction and operation to the tube 47 applied to the inlet fitting 23 as shown in FIGS. 5 and 7. The interior of the fitting part 111 is provided with a horizontal surface 121 and an inclined surface 122 along which the slugs 100 may move as they are being discharged from the process tube 20. The fitting part 111 is secured to and communicates with a vertical pipe 123 which is formed in sections. There is a plurality of vertical pipes 123, as seen in FIG. 2, all connected at their upper ends with a horizontal header 124 which connects with another horizontal header 125. Each vertical pipe 123 is connected through a plurality of discharge fittings 109 with a plurality of process tubes 20 and has at the level of each discharge fitting 109 a window 126 through which the discharge of slugs 100 into the vertical pipe may be watched. Each discharge fitting 109 is provided with a stop plunger 127 slidably mounted in the part 111 to project across the path of slugs coming from the process tube 20 so as to hold the slugs in the process tube, as shown in FIG. 10. To the end of the stop plunger 127 is affixed a rack 128 which meshes with a gear 129 mounted on a bracket 130 secured to the vertical pipe 123. The stop plunger 127 is moved up and down by horizontal actuation of a rod 131 which is connected with a crank 132 secured to a shaft 133 to which the gear 129 is also secured. The lower end of each vertical pipe 123 has a storage section 134 having a valve 135 at its upper end joining it with the rest of the pipe and a valve 136 at its lower end. When the slugs 100 come from the process tube 20 through the discharge fitting 109 past the retracted plunger 127, they descend in the vertical pipe 123 to the storage section 134.

During the portion of the operation of the reactor in which slugs are being neither charged nor discharged into the reactor, the charging machine is not attached to the reactor as shown in FIGS. 5 and 8, and a cooling liquid such as light water is supplied through the horizontal pipes 37 and the lines 36, the adaptors 35, the passages 34 in the inlet fittings 23, the annuli 30, and the passages 33 into the process tubes 20, where the cooling liquid flows in the annular spaces between the slugs 100 and the process tubes 20, since the slugs are of smaller external diameter than the internal diameter of the process tubes and rest upon a pair of internal ribs 137 in the process tubes. At this time the stop plungers 127 are in the down position as shown in FIG. 10 so that the force of the cooling liquid flowing through the process tubes will not carry the slugs out of the tubes. The cooling liquid flows from the process tubes through the discharge fittings 109, and upward through the vertical pipes 123, and out through the horizontal headers 124 and 125. As previously indicated the slugs may be of natural uranium covered with aluminum or may be of other materials to be irradiated covered with aluminum.

When it is desired to take out slugs from a certain process tube 20, a new slug is placed by hand in the tubular assembly 56 in the seal 67. As shown in FIG. 6, the slug has the same diameter as the ribs 69 of the seal 67 so that efficient sealing takes place, and the slug cannot move to the right, because the forward latching assembly 70 will prevent such movement, even though the plunger 101 is withdrawn. Now the forward tubular member 57 is attached to the nozzle member 25 of the inlet fitting 23 by application of the connector 54 to the lugs 51. Next the bleed valve 44 is opened, and pressure fluid flows through the passages 46 and 45 into the space between the flapper valve 40 and the slug 100 held in the seal 67 by the forward latch assembly 70. Fluid pressure is now equalized on both sides of the flapper valve 40, and this valve can be and is opened to the dash-dot position shown in FIG. 5. Pressure fluid cannot flow beyond the seal 67 because of sealing between the seal and the slug therein and the holding of the slug in the seal by the forward latch assembly 70. Previously the relief valve 65 will have been opened so that air trapped between the held slug and the flapper valve 40 will not interfere with flow of pressure fluid into the space between the held slug and the flapper valve. The plunger 101 is withdrawn to the right of the loading tray 94 as viewed in FIG. 3, and five slugs 100 are indexed into the trough 84 by angular movement of the indexing roller 92. The plunger 101 is moved to the left as viewed in FIG. 3, pushing the five slugs in the trough 84 through the tubular assembly 56 and the inlet fitting 23 and into the end of the process tube 20. The first slug will enter the process tube, pushing ahead of it into the process tube the slug that was originally in the seal 67; the fifth slug will be just beyond the forward latch assembly 70 and in the seal 67 as shown in FIG. 6; and the remaining slugs will lie in the forward tubular member 57 and the inlet fitting 23 between the first and fifth slugs. The extreme leftward movement of the plunger 101 is shown in FIG. 6 as taking the fifth slug 100 into the seal 67 just beyond the forward latching assembly 70. Next the plunger 101 is withdrawn to its extreme rightward position beyond the tray 94 by the application of suitable pressure fluid in the cylinder 108 against the piston 103. The pressure fluid in the reactor cannot force the slugs to follow the plunger 101, because the fifth slug is held by the latch assembly 70. Thereupon a new set of five slugs is indexed by the angular movement of the indexing roller 92 into the trough 84.

Now the previous cycle of operations is repeated, the second group of five slugs being moved beyond the forward latching assembly 70 and pushing ahead of them the five slugs of the first group into the process tube 20. The fifth slug of the second group is positioned in the seal 67 and cooperates with it to prevent a flow of pressure fluid from the reactor further into the charging machine within the seal 67.

During all of the aforementioned operations the stop plunger 127 will be lifted upward out of the way from the blocking position shown in FIG. 10 so that the pushing of new slugs into the process tube 20 will result in the pushing out of old slugs into the vertical pipe 123 through which they will descend into the vertical collecting sections 134, where they will be collected. At this time the upper valves 135 are open to admit the discharge slugs to the collecting sections, and the lower valves 136 are closed to keep them there.

The aforementioned operations are repeated until as many slugs as are needed are indexed from the loading tray 94 into the trough 84 and pushed beyond the forward latch assembly 70. Thereupon the plunger 101 is withdrawn to the right of the loading tray 94, and the extension 105 is placed in the trough 84. Now the plunger 101 is moved by the piston 103 to the left as far as the forward latching assembly 70, pushing the extension 105 ahead of it through the tubular assembly 56 and into the inlet fitting 23, so that the last slug of the last group has pushed to the full-line position for the slug shown in the annulus 30 in FIG. 8. Since the tapered portion 104 of the plunger 101 enters the rear end of the extension 105, as shown in FIG. 8, and the plunger 101 moves only as far with respect to the latching assembly 70 as shown in FIG. 6, the rear end of the extension 105 cannot be engaged by the element 72 of the forward latch assembly 70. Thus when the plunger 101 is withdrawn to the right, the pressure fluid in the reactor will force the extension 105 back to the position shown in FIG. 8, in which the extension is engaged by a rearward latch assembly 71. The extension 105 is of such diameter as to fit the internal rib 69 in the seal 67 relatively tightly and create a good sealing action. The forward end of the extension 105 lies within the tubular assembly 56 as shown in FIG. 8, and so the extension is then in position to seal the charging machine against the entrance of pressure fluid and yet to provide no interference with disconnection of the tubular member 56 of the charging machine from the end of the nozzle member 25 of the reactor. When the parts are positioned as shown in FIG. 8, the flap valve 40 is closed, the bleed valve 44 is closed, and the drain valve 66 is opened if necessary. Thereupon the connector 54 may be detached from the lugs 51. Now the charging machine can be shifted to an inlet fitting for another process tube 20 for loading it with new slugs. Directly after the last slugs have been loaded into the process tube from the inlet fitting 23 from which the charging machine, as described, is being disconnected, the stop plunger 127 is returned by actuation of the rod 131. The valves 135 at the upper ends of the storage sections 134 are closed, the valves 136 at the lower ends of the storage sections are then opened, allowing the slugs in the storage sections to fall into body of water 138 where they are held until their radioactivity has subsided to a safe level.

The movements of the plunger 101 and the indexing roller 92 may be carried out manually or automatically as may be desired. For example, the flow of pressure fluid into the cylinder 108 to the piston 103, which moves the plunger 101, may be reversed automatically upon arrival of the plunger at its extreme leftward position, shown in FIG. 6, and the arrival of the plunger 101 at the extreme rightward position beyond the loading tray 94 may first produce angular movement of the indexing roller 92 resulting in the shifting of a new group of slugs 100 into the trough 84 and then reversal of the pressure fluid applied to the cylinder 108 against the piston 103. However, it is to be noted that it is immaterial to the charging machine of the present invention whether the above actions be carried out manually or automatically.

The intention is to limit the invention only within the scope of the appended claims.

What is claimed is:

1. A charging machine comprising a tubular housing, a connector mounted at one end of the housing, a seal positioned in the housing in spaced relation to the said one end, a latch mounted on the tubular housing so as to project thereinto and being adjacent the seal on the side thereof away from the said one end, a charging trough connected with the said other end of the tubular housing and extending therefrom in alignment therewith, a loading tray connected with and extending laterally therefrom, an indexing means for moving a group of objects from the tray to the trough, and means moving in the trough from the end thereof away from the tubular housing to the latch for pushing the group of objects in the trough through the tubular housing so as to position the last object of the group in the seal and in latching relation with the latch and the other objects of the group beyond the seal in the tubular housing and into a treating device in which liquid under pressure flows continuously and to which the charging machine is attached by the connector, the latch engaging the said last object of the group to prevent the pressure liquid in the treating device from forcing the group to follow the pushing means when it withdraws to permit a new group of objects to be indexed from the tray to the trough, the said last object cooperating with the seal to prevent pressure liquid from entering the charging machine farther than the seal.

2. A charging machine comprising a tubular housing, a connector mounted at one end of the housing, a seal positioned in the housing in somewhat spaced relation to the said one end, first and second latches mounted on the tubular housing so as to project thereinto, the first latch being adjacent the seal on the side thereof away from the said one end, the second latch being adjacent the other end of the tubular housing, a charging trough connected with the said other end of the tubular housing and extending therefrom in alignment therewith, a loading tray connected with and extending laterally therefrom, an indexing means for moving a group of objects from the tray to the trough, means moving in the trough from the end thereof away from the tubular housing to the first latch for pushing the group of objects in the trough through the tubular housing so as to position the last object of the group in the seal and in latching relation with the first latch and the other objects of the group beyond the seal in the tubular housing and in a treating device in which liquid under pressure flows continuously and to which the charging machine is attached by the connector, the first latch engaging the said last object of the group to prevent the pressure liquid in the treating device from forcing the group to follow the pushing means when it withdraws to permit a new group of objects to be indexed from the tray to the trough, the said last object cooperating with the seal to prevent pressure liquid from entering the charging machine farther than the seal, and an extensin adapted to be applied to the pushing means for expelling all objects of a final group into the treating device by movement of the pushing means to the first latch, the extension being adapted to overlap the pushing means so as to be prevented from being held by the first latch and thus being caused by the pressure fluid of the treating device to follow the pushing means during its withdrawal as far as the second latch, the second latch holding the extension in a position in which it is withdrawn from the treating device and lies within the seal, whereby the charging machine may be detached from the treating device and the pressure fluid in the treating device is prevented from penetrating the charging machine. beyond the seal.

3. A charging machine comprising a tubular housing, a connector connected to one end of the housing, a seal positioned in the housing in somewhat spaced relation to the said one end, first and second latches mounted on the tubular housing so as to project thereinto, the first latch being adjacent the seal on the side thereof away from the said one end of the housing, means moving in the housing as far as the first latch for pushing a group of objects through the housing so as to position the last object of the group in the seal and in latching relation with the first latch and the other objects of the group beyond the seal in the tubular housing and in a treating device in which liquid under pressure flows continuously and to which the charging machine is attached by the connector, the first latch engaging the said last object of the group to prevent the pressure liquid in the treating device from forcing the group to follow the pushing means when it withdraws to bring a new group of objects into the housing, the said last object of the group cooperating with the seal to prevent pressure liquid from entering the charging machine farther than the seal, and an extension adapted to be applied to the pushing means for expelling of objects of a final group into the treating device by movement of the pushing means to the first latch, the extension being adapted to overlap the pushing means so as to be prevented from being held by the first latch and thus being caused by the pressure fluid of the treating device to follow the pushing means during its withdrawal as far as the second latch, the second latch holding the extension in a position in which it is withdrawn from the treating device and lies within the seal, whereby the charging machine may be detached from the treating device and the pressure fluid in the treating device is prevented from penetrating the charging machine beyond the seal.

* * * * *